United States Patent
Chen

(10) Patent No.: US 11,563,374 B2
(45) Date of Patent: Jan. 24, 2023

(54) SWITCHING MODE POWER SUPPLY PREVENTING FALSE TRIGGERING OF A SWITCH

(71) Applicant: Chengdu Monolithic Power Systems Co., Ltd., Chengdu (CN)

(72) Inventor: Yuedong Chen, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 49 days.

(21) Appl. No.: 16/928,257

(22) Filed: Jul. 14, 2020

(65) Prior Publication Data

US 2021/0028698 A1 Jan. 28, 2021

(30) Foreign Application Priority Data

Jul. 26, 2019 (CN) .......................... 201910686562.9

(51) Int. Cl.
*H02M 3/156* (2006.01)
*H02M 1/00* (2006.01)

(52) U.S. Cl.
CPC ............ *H02M 3/156* (2013.01); *H02M 1/007* (2021.05); *H02M 1/0038* (2021.05)

(58) Field of Classification Search
CPC ...... H02M 1/0038; H02M 1/007; H02M 1/42; H02M 1/4208; H02M 1/4225; H02M 3/155–1588
See application file for complete search history.

(56) References Cited

U.S. PATENT DOCUMENTS

| | | | |
|---|---|---|---|
| 10,432,104 B2 | 10/2019 | Li et al. | |
| 2010/0097829 A1* | 4/2010 | Uno ................... | H02M 1/44 363/124 |
| 2011/0194312 A1* | 8/2011 | Gaknoki ............... | H02M 1/083 363/21.12 |
| 2012/0169240 A1* | 7/2012 | Macfarlane ......... | H02M 1/4225 315/152 |
| 2014/0036559 A1* | 2/2014 | Watanabe .............. | G01R 19/00 363/84 |
| 2016/0111970 A1* | 4/2016 | Nate ..................... | H02M 7/217 315/201 |
| 2016/0380530 A1* | 12/2016 | Maruyama .......... | H02M 1/4225 323/210 |
| 2016/0380552 A1* | 12/2016 | Chung .................... | H02M 1/36 363/84 |

(Continued)

FOREIGN PATENT DOCUMENTS

| WO | WO-2011073124 A1 * | 6/2011 | .......... H02M 1/4225 |
|---|---|---|---|
| WO | WO-2019026706 A1 * | 2/2019 | ........... G01R 19/175 |

OTHER PUBLICATIONS

S.M. Kaplan, "Triac", in Wiley Electrical and Electronics Engineering Dictionary. Hoboken, NJ: John Wiley & Sons, 2004. (Year: 2004).*

(Continued)

*Primary Examiner* — Fred E Finch, III
(74) *Attorney, Agent, or Firm* — Perkins Coie LLP

(57) ABSTRACT

A switching mode power supply preventing a first switch from being falsely triggered. The switching mode power supply detects a peak of an input signal and starts timing a period of time since the arrival of the peak of the input signal is detected. The first switch starts performing the on and off switching operations when the period of time expires.

15 Claims, 6 Drawing Sheets

(56) References Cited

U.S. PATENT DOCUMENTS

| | | | |
|---|---|---|---|
| 2018/0006577 A1* | 1/2018 | Ng | H02M 7/21 |
| 2019/0199204 A1* | 6/2019 | Bhandarkar | H02M 7/217 |
| 2020/0007115 A1* | 1/2020 | Franke | G01R 19/04 |
| 2020/0112243 A1* | 4/2020 | Dusmez | H02M 1/4208 |
| 2020/0158766 A1* | 5/2020 | Nate | G01R 19/175 |
| 2020/0161985 A1 | 5/2020 | Li et al. | |

OTHER PUBLICATIONS

Thyristor Theory and Design Considerations Handbook, HBD855/D, On Semiconductor, Rev. 1, Nov. 2006. (Year: 2006).*

* cited by examiner

US 11,563,374 B2

SWITCHING MODE POWER SUPPLY PREVENTING FALSE TRIGGERING OF A SWITCH

CROSS-REFERENCE TO RELATED APPLICATIONS

This application claims the benefit of CN application No. CN201910686562.9, filed on Jul. 26, 2019, and incorporated herein by reference.

FIELD OF THE INVENTION

The present invention relates generally to a switching mode power supply (SMPS), and more particularly but not exclusively to false triggering of a switch in the SMPS.

BACKGROUND OF THE INVENTION

An input signal can be converted into an output signal by turning a switch on and off in a switching mode power supply (SMPS). As a common control method to turn on the switch, the current flowing through a primary winding coupled to the switch is detected, and a zero-crossing detecting signal is then generated based on the current and is further compared with a zero-crossing threshold signal so as to decide whether to turn on the switch or not. However, as the zero-crossing detecting signal usually has a ripple, and due to the effect of the ripple, the zero-crossing detecting signal can reach the zero-crossing threshold signal easily when the value of the zero-crossing detecting signal is close to the value of the zero-crossing threshold signal, and the switch is turned on as a result. This turning-on operation induced by the ripple is not expected and should be avoided. What's worse, the ripple fluctuates up and down continually, which in turn causes the switch to be turned on and off repeatedly, and as a result, the current flowing through the primary winding increases all the way and is eventually out of control.

FIG. 1 schematically illustrates an SMPS 100 where the above-mentioned false turning-on operation occurs. As shown in FIG. 1, the SMPS 100 comprises a switching circuit 11. The switching circuit 11 comprises a primary winding LP and a first switch S1, and by turning the first switch S1 on and off alternately, the switching circuit 11 operates to convert an input signal with a peak into an output signal $V_{OUT}$. More particularly, the switching circuit 11 is implemented with a boost switching converting topology as shown in FIG. 1 to convert a voltage $V_{FIL}$ received at an input terminal of the switching circuit 11 into an output voltage $V_{OUT}$ with a value greater than the voltage $V_{FIL}$. The SMPS 100 further comprises a zero-crossing detecting circuit 14 which comprises an auxiliary winding LA. The auxiliary winding LA is coupled to the primary winding LP to sense the current $I_L$ flowing through the primary winding LP and then generates a zero-crossing detecting signal $V_{ZCD}$ based on the current $I_L$. The SMPS 100 compares the zero-crossing detecting signal $V_{ZCD}$ with a zero-crossing threshold signal $V_{ZCD\_TH}$ with a comparator CMP1 and then turns on the first switch S1 when the zero-crossing detecting signal $V_{ZCD}$ decreases to the zero-crossing threshold signal $V_{ZCD\_TH}$.

It can be known from the operating principle of an SMPS, the zero-crossing detecting signal $V_{ZCD}$ is equal to $-V_{FIL}/N$ when the first switch S1 is on and is equal to $(V_{OUT}-V_{FIL})/N$ when the first switch S1 is off, wherein N is the turns ration between the primary winding LP and the auxiliary winding LA. Thus, if the output voltage $V_{OUT}$ is close to the voltage $V_{FIL}$, the value $((V_{OUT}-V_{FIL})/N)$ of the zero-crossing detecting signal $V_{ZCD}$ is relatively small and is close to the zero-crossing threshold signal $V_{ZCD\_TH}$ when the first switch S1 is off. On the other hand, the SMPS 100 further comprises a filtering circuit 12 and the filtering signal $V_{FIL}$ generated by the filtering circuit 12 based on the input signal has a ripple. Thus, the zero-crossing detecting signal $V_{ZCD}$ can reach the zero-crossing threshold signal $V_{ZCD\_TH}$ easily, which in turn causes the first switch S1 to be turned on falsely.

Thus, a switching mode power supply and its corresponding driving circuit and driving method are desired to at least address the above-mentioned issues.

SUMMARY

Embodiments of the present invention are directed to a driving circuit in a switching mode power supply, wherein the switching mode power supply comprises a first switch and the switching mode power supply is configured to convert an input signal with a peak into an output signal through the on and off switching operations of the first switch, the driving circuit comprising: a peak detecting circuit configured to detect the peak of the input signal; a delay circuit configured to time a period of time since the arrival of the peak of the input signal and to generate a delay signal; and a switching control circuit configured to start the on and off switching operations of the first switch when the period of time expires.

Embodiments of the present invention are also directed to a driving method for driving a switching mode power supply, wherein the switching mode power supply comprises a first switch and the switching mode power supply is configured to convert an input signal with a peak into an output signal through the on and off switching operations of the first switch, the driving method comprising: detecting the peak of the input signal; timing a period of time since the arrival of the peak of the input signal; and starting the on and off switching operations of the first switch after the period of time expires.

Embodiments of the present invention are further directed to a switching mode power supply, comprising: a first switch, wherein the switching mode power supply is configured to convert an input signal with a peak into an output signal through the on and off switching operations of the first switch; a peak detecting circuit configured to detect the peak of the input signal; a delay circuit configured to time a period of time since the arrival of the peak of the input signal is detected and to generate a delay signal; and a switching control circuit configured to start the on and off switching operations of the first switch when the period of time expires.

DESCRIPTION OF THE DRAWINGS

The present invention can be further understood with reference to the following detailed description and the appended drawings, wherein like elements are provided with like reference numerals.

DESCRIPTION

Figure 1:
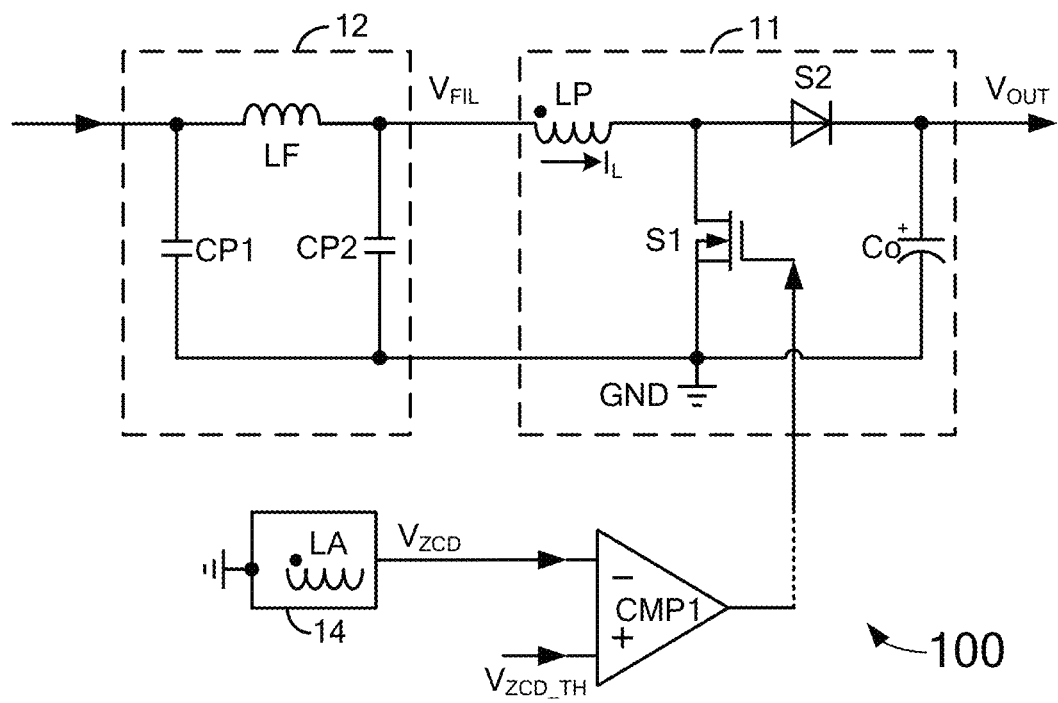
FIG. 1 schematically illustrates a prior-art SMPS 100.

The present invention is now described. While it is disclosed in its preferred form, the specific embodiments of the invention as disclosed herein and illustrated in the drawings are not to be considered in a limiting sense. Rather, these embodiments are provided so that this invention will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the invention, the meaning of "a," "an," and "the" may also include plural references. For example, "a peak" in the present invention may refer to one peak or a plurality of peaks, depending on the specific context.

Figure 2:
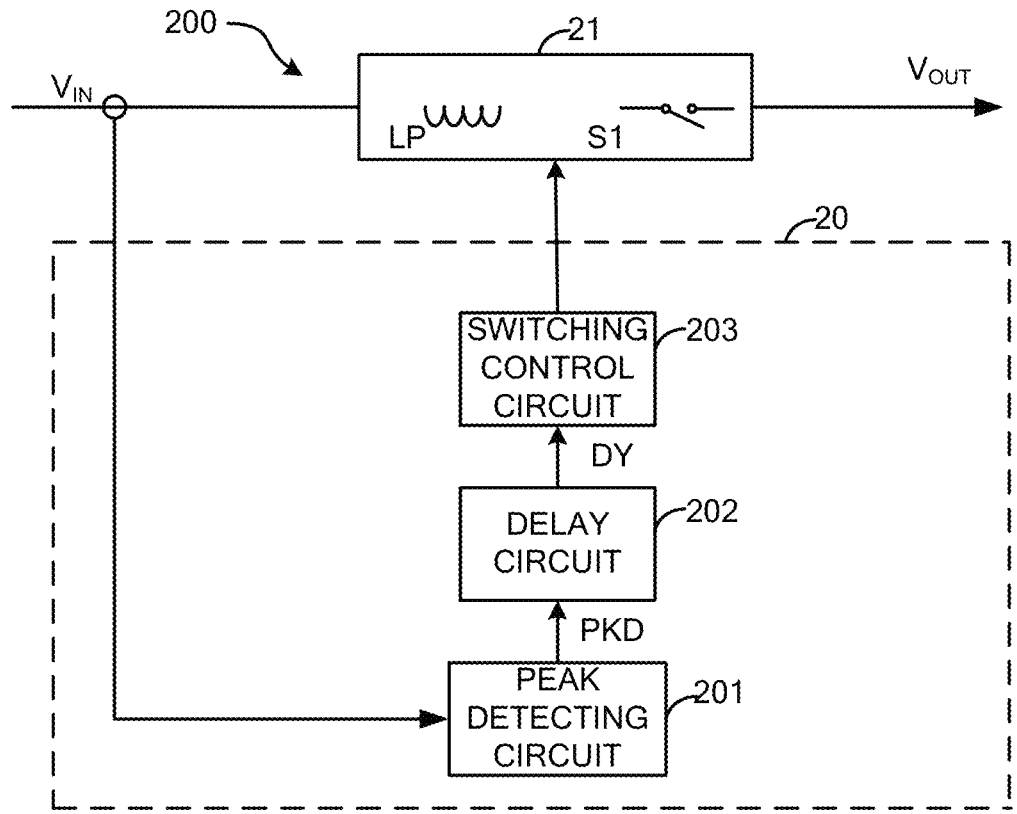
FIG. 2 schematically illustrates an SMPS 200 in accordance with an embodiment of the present invention.

FIG. 2 schematically illustrates an SMPS 200 in accordance with an embodiment of the present invention. As shown in FIG. 2, the SMPS (switching mode power supply) 200 is configured to comprise a switching circuit 21 which comprises a first switch S1 and a primary winding LP serially coupled to the first switch S1. The SMPS 200 is configured to storage and/or release energy through the primary winding LP and to covert an input signal $V_{IN}$ with a peak into an output signal $V_{OUT}$ through the on and off switching operations of the first switch S1. In an embodiment, the input signal $V_{IN}$ can be an alternate current input signal, such as a sine wave alternate current signal. Yet in another embodiment, the input signal $V_{IN}$ can be a direct current signal, such as a half sine wave signal generated by rectifying a sine wave alternate current signal. In an embodiment, the first switch S1 can be a metal-oxide-semiconductor field effect transistor (MOSFET). Yet in another embodiment, the first switch S1 can be any appropriate switching component.

The SMPS 200 is further configured to comprise a driving circuit 20. The driving circuit 20 is configured to comprise a peak detecting circuit 201, a delay circuit 202 and a switching control circuit 203. The peak detecting circuit 201 is configured to detect the peak of the input signal $V_{IN}$, the delay circuit 202 is configured to delay a period of time $T_D$ (referred to as a delay time $T_D$ hereafter) since the arrival of the peak of the input signal $V_{IN}$ and to generate a delay signal, and the switching control circuit 203 is configured to start the on and off switching operations of the first switch S1 after the delay time $T_D$ expires.

In some embodiments, for example, in the embodiment where the input signal $V_{IN}$ is an alternate current input signal, the delay time $T_D$ can have a value that is not equal to an integral multiple of the half cycle of the input signal $V_{IN}$, for example, the delay time $T_D$ can be less than one half of the cycle of the input signal $V_{IN}$, more particularly, the delay time $T_D$ can be equal to or less than a quarter of the cycle of the input signal $V_{IN}$. In other embodiments, for example, in the embodiment where the input signal $V_{IN}$ is a half sine wave signal, the delay time $T_D$ can have a value that is not equal to an integral multiple of the cycle of the input signal $V_{IN}$, for example, the delay time $T_D$ can be less than the cycle of the input signal $V_{IN}$, more particularly, the delay time $T_D$ can be equal to or less than one half of the cycle of the input signal $V_{IN}$.

In particular, the peak detecting circuit 201 is configured to receive a feed forward signal representative of the input signal $V_{IN}$, to detect the peak of the input signal $V_{IN}$ through the feed forward signal and then to output a peak detecting signal PKD based on the detection of the peak of the input signal $V_{IN}$. In an embodiment, the feed forward signal is a signal converted from the input signal $V_{IN}$. Yet in another embodiment, the feed forward signal can be the input signal $V_{IN}$ itself. The delay circuit 202 is coupled to the peak detecting circuit 201 to receive the peak detecting signal PKD and is configured to generate the delay signal DY based on the peak detecting signal PKD. The switching control circuit 203 is coupled to the delay circuit 202 to receive the delay signal DY and is configured to control the start of the on and off switching operations of the first switch S1 based on the delay signal DY.

In more detail, the peak detecting signal PKD is in a non-activated state (e.g., logic low "0") when no peak of the input signal $V_{IN}$ is detected, and the peak detecting signal PKD generates a pulse (e.g., logic high "1") when the arrival of a peak of the input signal $V_{IN}$ is detected. In an embodiment, the pulse can be a short pulse. Being triggered by the pulse of the peak detecting signal PKD, the delay circuit 202 starts timing and the delay signal DY transits from a non-activated state (e.g., logic low "0") to an activated state (e.g., logic high "1"), and when the delay time $T_D$ expires, the delay circuit 202 stops timing and the delay signal DY transits from the activated state (e.g., logic high "1") to the non-activated state (e.g., logic low "0"). The switching control circuit 203 will not start the on and off switching operations of the first switch S1 when the delay signal DY is in the activated state; and only after the delay signal DY transits from the activated state to the non-activated state, the switching control circuit 203 is able to start the on and off switching operations of the first switch S1, and the SMPS 200 is thus able to convert the input signal $V_{IN}$ into the output signal $V_{OUT}$ by turning the first switch S1 on and off periodically.

In an embodiment, the peak detecting circuit 201 can be an analog to digital convertor (ADC). The ADC samples the feed forward signal repeatedly, and compares the later sampled value with the previously sampled value. If the later sampled value is higher than the previously sampled value, it is detected that no peak of the input signal $V_{IN}$ arrives and the peak detecting signal PKD is in its non-activated state; and if the later sampled value is lower than the previously sampled value, it is detected that the peak of the input signal $V_{IN}$ arrives and the peak detecting signal PKD generates the pulse.

Figure 10:
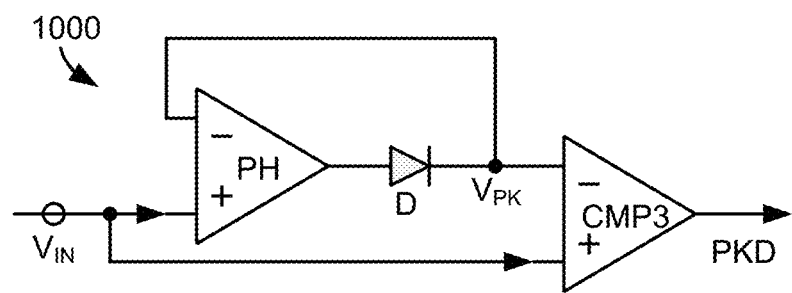
FIG. 10 schematically illustrates a peak detecting circuit 1000 in accordance with another embodiment of the present invention.

Persons of ordinary skill in the art will recognize that the ADC should not be used to limit the present invention, in another embodiment, the peak detecting circuit 201 may have any other appropriate configuration. For example, FIG. 10 schematically illustrates a peak detecting circuit 1000 in accordance with another embodiment of the present invention. As shown in FIG. 10, the peak detecting circuit 1000 is configured to comprise an amplifier PH having a first input terminal, a second input terminal and an output terminal, wherein the first input terminal of the amplifier PH is configured to receive the feed forward signal representative of the input signal $V_{IN}$. The peak detecting circuit 1000 is further configured to comprise a diode D having an anode and a cathode, wherein the anode of the diode D is coupled to the output terminal of the amplifier PH, and the cathode of the diode D is coupled to the second input terminal of the amplifier PH. In this way, it can be known from the operating principle of the circuit, a peak value VPK of the feed forward signal will be provided at the cathode of the diode D. The peak detecting circuit 1000 is further configured to comprise a comparator CMP3 having a first input terminal, a second input terminal and an output terminal, wherein the first input terminal of the compactor CMP3 is coupled to the cathode of the diode D, and the second input terminal of the comparator CMP3 is configured to receive the feed forward signal. The comparator CMP3 compares the feed forward signal with the peak value VPK. In detail, when the feed forward signal is lower than the peak value VPK, the peak detecting signal PKD is in its non-activated state, indicating that no peak of the input signal $V_{IN}$ arrives; and when the feed forward signal is higher than the peak value VPK, the peak detecting signal PKD generates the pulse, indicating that the peak of the input signal $V_{IN}$ arrives. In an embodiment, a compensation is provided in the comparator CMP3, and the comparator CMP3 compares the sum of the feed forward signal and a compensation value with the peak value VPK. In this way, even when the value of the next peak of the input signal $V_{IN}$ is lower than the peak value VPK due to the fact that a peak value may be different from another for difference cycles, the arrival of the next peak of the input signal $V_{IN}$ can still be detected. In an embodiment, the first input terminal and the second input terminal of the amplifier PH are respectively a non-inverting input terminal and an inverting input terminal of the amplifier PH. In yet an embodiment, the first input terminal and the second input terminal of the comparator CMP3 are respectively an inverting input terminal and a non-inverting input terminal of the comparator CMP3.

Persons of ordinary skill in the art will recognize that, in the present invention, the delay signal DY is not necessarily the only condition for the switching control circuit 203 to start the on and off switching operations of the first switch S1. In other words, in an embodiment, the switching control circuit 203 is also under control of other conditions, the switching control circuit 203 starts the on and off switching operations of the first switch S1 only when the other conditions are satisfied and meanwhile the delay time $T_D$ expires. Of course, yet in another embodiment, the delay signal DY can be the only condition that controls the switching control circuit 203 to start the on and off switching operations of the first switch S1 in the switching circuit 21, that is, the switching control circuit 203 starts the on and off switching operations of the first switch S1 in the switching circuit 21 as long as the delay time $T_D$ expires.

Figure 3:
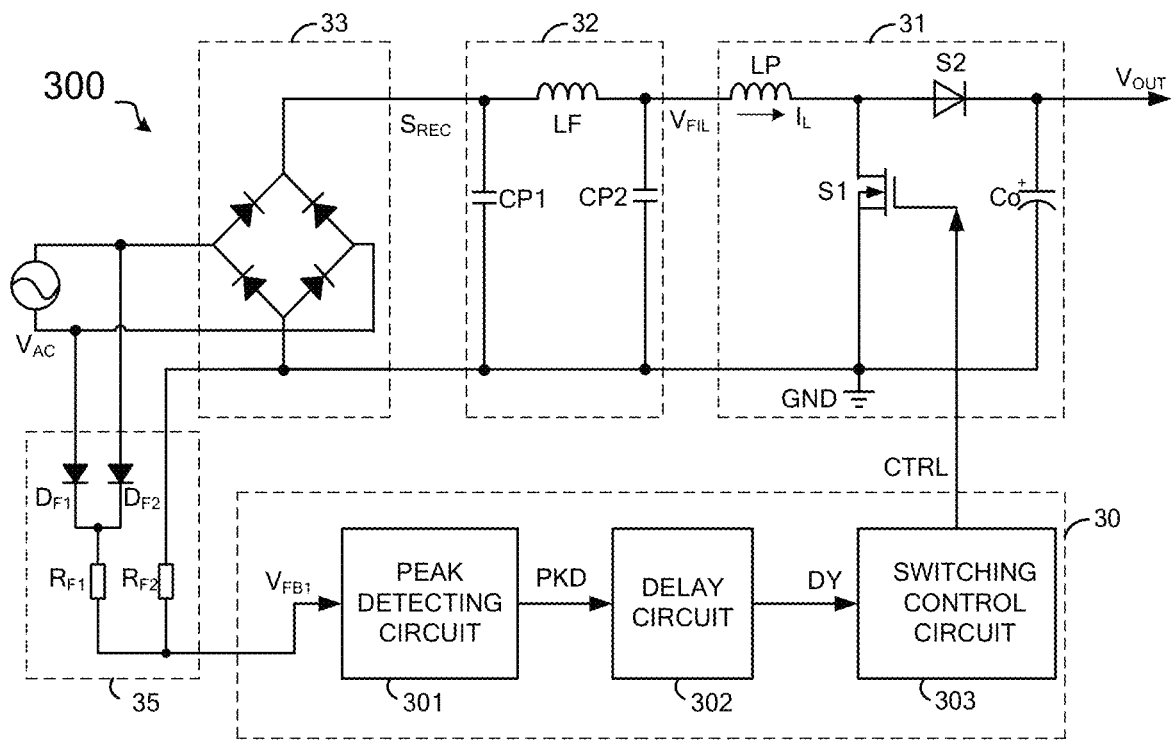
FIG. 3 schematically illustrates an SMPS 300 in accordance with another embodiment of the present invention.

FIG. 3 schematically illustrates an SMPS 300 in accordance with another embodiment of the present invention. As shown in FIG. 3, the SMPS 300 is configured to comprise a first switch S1, the SMPS 300 converts an input signal $V_{IN}$ with a peak into an output signal $V_{OUT}$ through the on and off switching operations of the first switch S1. As shown in FIG. 3, the SMPS 300 is further configured to comprise a rectifying circuit 33 which is configured to rectify an alternate current input signal $V_{AC}$ to generate a rectified signal $S_{REC}$. In an embodiment, the rectifying circuit 33 can be a full-bridge rectifying circuit; yet in another embodiment, the rectifying circuit 33 can be a half-bridge rectifying circuit or any other appropriate rectifying circuit. In an embodiment, the input signal $V_{IN}$ can be the alternate current input signal $V_{AC}$ or the rectified signal $S_{REC}$.

As shown in FIG. 3, the SMPS 300 can be further configured to comprise a filtering circuit 32 for filtering the rectified signal $S_{REC}$ to generate a filtering signal $V_{FIL}$. FIG. 3 schematically illustrates an exemplary configuration of the filtering circuit 32. As shown in FIG. 3, the filtering circuit 32 is configured to comprise a capacitor CP1, a filtering capacitor CP2 and a filtering inductor LF. The capacitor CP1 has a first terminal and a second terminal, wherein the first terminal of the capacitor CP1 is coupled to the rectifying circuit 33 to receive the rectified signal $S_{REC}$, and the second terminal of the capacitor CP1 is coupled to a reference ground GND. The filtering inductor LF has a first terminal and a second terminal, wherein the first terminal of the filtering inductor LF is coupled to the rectifying circuit 33 to receive the rectified signal $S_{REC}$. The filtering capacitor CP2 has a first terminal and a second terminal, the first terminal of the filtering capacitor CP2 is coupled to the second terminal of the filtering inductor LF and is configured to provide the filtering signal $V_{FIL}$, and the second terminal of the filtering capacitor CP2 is coupled to the reference ground GND. Persons of ordinary skill in the art will understand that, the filtering circuit 32 may have any appropriate configuration. For example, in an embodiment, the filtering circuit may comprise the filtering capacitor CP2 and the filtering inductor LF as shown in FIG. 3, but not include the capacitor CP1. Yet in another embodiment, the filtering circuit may comprise the filtering capacitor CP2, but not include the capacitor CP1 and the filtering inductor LF.

As shown in FIG. 3, the SMPS 300 may be further configured to comprise a switching circuit 31 which comprises the first switch S1. The switching circuit 31 converts the filtering signal $V_{FIL}$ into the output signal $V_{OUT}$ through the on and off switching operations of the first switch S1. FIG. 3 schematically illustrates a configuration of the switching circuit. As shown in FIG. 3, the switching circuit 31 has a boost switching converting typology. In detail, the switching circuit 31 comprises a primary winding LP (the inductor LP), the first switch S1, a second switch S2 and an output capacitor Co. The primary winding LP has a first terminal and a second terminal, wherein the first terminal of the primary winding LP is coupled to the filtering circuit 32 to receive the filtering signal $V_{FIL}$. The first switch S1 has a first terminal, a second terminal and a control terminal, wherein the first terminal of the first switch S1 is coupled to the second terminal of the primary winding LP, and the second terminal of the first switch S1 is coupled to the reference ground GND. In the embodiment shown in FIG. 3, the first switch S1 is implemented with a MOSFET, yet in another embodiment, the first switch S1 may have any appropriate switching configuration. The second switch S2 has a first terminal and a second terminal, wherein the first terminal of the second switch S2 is coupled the second terminal of the primary winding LP. The output capacitor Co has a first terminal and a second terminal, wherein the first terminal of the output capacitor Co is coupled to the second terminal of the second switch S2, and the second terminal of the output capacitor Co is coupled to the reference ground GND. As shown in FIG. 3, the second switch S2 is implemented with a diode, and an anode of the diode is configured as the first terminal of the second switch S2, and a cathode of the diode is configured as the second terminal of the second switch S2. In another embodiment, the second switch S2 may have any appropriate configuration, such as a MOSFET. Persons of ordinary skill in the art will understand that, the boost switching converting topology shown in FIG. 3 is only for illustration purpose, and in another embodiment, the switching circuit 31 may have any appropriate switching converting topology.

As shown in FIG. 3, the SMPS 300 may be further configured to comprise a feed forward circuit 35 configured to receive the input signal $V_{IN}$ and to generate a feed forward signal $V_{FB1}$ representative of the input signal $V_{IN}$ based on the input signal $V_{IN}$. The peak detecting circuit 30 is coupled to the feed forward circuit 35 to receive the feed forward signal $V_{FB1}$ and is configured to detect the peak of the input signal $V_{IN}$ through the feed forward signal $V_{FB1}$. In the embodiment of FIG. 3, the alternate current input signal $V_{AC}$ is used as the input signal $V_{IN}$, and the feed forward circuit 35 is configured to receive the alternate current input signal $V_{AC}$ and to generate the feed forward signal $V_{FB1}$ representative of the alternate current input signal $V_{AC}$ based on the alternate current input signal $V_{AC}$. FIG. 3 schematically illustrates a configuration of the feed forward circuit 35. As shown in FIG. 3, the feed forward circuit 35 is configured to comprise feed forward diodes DF1 and DF2, and feed forward resistors RF1 and RF2. The feed forward diodes DF1 and DF2 respectively have an anode and a cathode, wherein the anodes of the feed forward diodes DF1 and DF2 are respectively coupled to a negative terminal and a positive terminal of the alternate current input signal $V_{AC}$, and the cathodes of the feed forward diodes DF1 and DF2 are coupled together. The feed forward resistor RF1 has a first terminal and a second terminal, wherein the first terminal of the feed forward resistor RF1 is coupled to the cathodes of the feed forward diodes DF1 and DF2. The feed forward resistor RF2 has a first terminal and a second terminal, wherein the first terminal of the feed forward resistor RF2 is coupled to the second terminal of the feed forward resistor RF1, and the second terminal of the feed forward resistor RF2 is coupled to the reference ground GND. The second terminal of the feed forward resistor RF1 and the first terminal of the feed forward resistor RF2 are configured as a common terminal to provide the feed forward signal $V_{FB1}$. Persons of ordinary skill in the art will recognize that, the above-mentioned configuration of the feed forward circuit 35 should not be interpreted in a limited way, in another embodiment, the feed forward circuit 35 may have any appropriate configuration. For example, in an embodiment, the feed forward circuit 35 may additionally comprise a feed forward capacitor coupled between the common terminal of the feed forward diodes DF1 and DF2 and the reference ground GND. Yet in another embodiment, the feed forward circuit 35 may further comprise a capacitor coupled between the positive and negative terminals of the alternate current input signal $V_{AC}$. Still in another embodiment, the feed forward circuit 35 may comprise one of the feed forward diodes DF1 and DF2.

Figure 4:
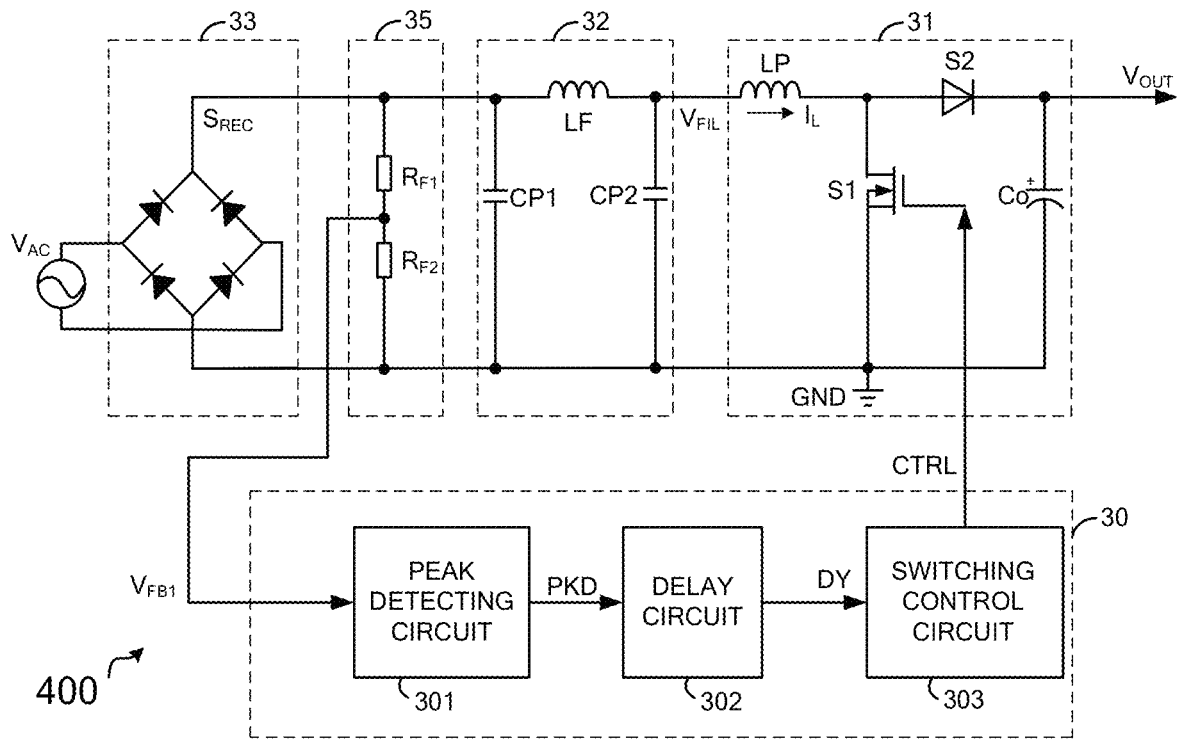
FIG. 4 schematically illustrates an exemplary SMPS 400 with the input signal $V_{IN}$ implemented with the rectified signal $S_{REC}$.

FIG. 4 schematically illustrates an exemplary SMPS 400 with the input signal $V_{IN}$ implemented with the rectified signal $S_{REC}$. The SMPS 400 has a similar configuration as that of the SMPS 300 except that, in the embodiment of FIG. 4, the feed forward circuit 35 is configured to receive the rectified signal $S_{REC}$ and to generate the feed forward signal $V_{FB1}$ representative of the rectified signal $S_{REC}$ based on the rectified signal $S_{REC}$. In the embodiment shown in FIG. 4, the feed forward circuit 35 is configured to comprise the serially coupled feed forward resistors RF1 and RF2 which are coupled between the rectifying circuit 33 and the reference ground GND, and the common terminal of the feed forward resistors RF1 and RF2 provides the feed forward signal $V_{FB1}$.

Referring back to FIG. 3, the SMPS 300 is further configured to comprise a driving circuit 30. The driving circuit 30 is configured to comprise a peak detecting circuit 301, a delay circuit 302 and a switching control circuit 303. The peak detecting circuit 301 is configured to detect the peak of the input signal $V_{IN}$, the delay circuit 302 is configured to time a period of time $T_D$ since the arrival of the peak of the input signal $V_{IN}$ is detected, and the switching control circuit 303 is configured to start the on and off switching operations of the first switch S1 after the delay time $T_D$ expires.

In some embodiments, for example, in the embodiment where the input signal $V_{IN}$ is the alternate current input signal $V_{AC}$, the delay time $T_D$ can have a value that is not equal to an integral multiple of one half of the cycle of the alternate current input signal $V_{AC}$, for example, the delay time $T_D$ can be less than one half of the cycle of the alternate current input signal $V_{AC}$, more particularly, the delay time $T_D$ can be equal to or less than a quarter of the cycle of the alternate current input signal $V_{AC}$. In other embodiments, for example, in the embodiment where the input signal $V_{IN}$ is the rectified signal $S_{REC}$, the delay time $T_D$ can have a value that is not equal to an integral multiple of one cycle of the rectified signal $S_{REC}$, for example, the delay time $T_D$ can be less than one cycle of the rectified signal $S_{REC}$, more particularly, the delay time $T_D$ can be equal to or less than one half of the cycle of the rectified signal $S_{REC}$.

In particular, the peak detecting circuit 301 is configured to receive the feed forward signal representative of the input signal $V_{IN}$, to detect the peak of the input signal $V_{IN}$ through the feed forward signal and then to output a peak detecting signal PKD based on the detecting result. In an embodiment, the feed forward signal is a signal converted from the input signal $V_{IN}$. Yet in another embodiment, the feed forward signal can be the input signal $V_{IN}$ itself. The delay circuit 302 is coupled to the peak detecting circuit 301 to receive the peak detecting signal PKD and is configured to generate a delay signal DY based on the peak detecting signal PKD. The switching control circuit 303 is coupled to the delay circuit 302 to receive the delay signal DY and is configured to control the start of the on and off switching operations of the first switch S1 based on the delay signal DY.

In more detail, the peak detecting signal PKD is in a non-activated state (e.g., logic low "0") when no peak of the input signal $V_{IN}$ is detected, and the peak detecting signal PKD generates a pulse (e.g., logic high "1") when the arrival of the peak of the input signal $V_{IN}$ is detected. When triggered by the pulse of the peak detecting signal PKD, the delay circuit 302 starts timing and the delay signal DY transits from a non-activated state (e.g., logic low "0") to an activated state (e.g., logic high "1"), and when the delay time $T_D$ expires, the delay circuit 302 stops timing and the delay signal DY transits from the activated state (e.g., logic high "1") to the non-activated state (e.g., logic low "0"). The switching control circuit 303 will not start the on and off switching operations of the first switch S1 when the delay signal DY is in the activated state; and only after the delay signal DY transits from the activated state to the non-activated state, the switching control circuit 303 is able to start the on and off switching operations of the first switch S1, and the SMPS 300 is thus able to convert the input signal $V_{IN}$ into the output signal $V_{OUT}$ by turning the first switch S1 on and off periodically.

In an embodiment, the peak detecting circuit 301 can be an analog to digital convertor (ADC). The ADC samples the feed forward signal repeatedly, and compares the later sampled value with the previously sampled value. If the later sampled value is higher than the previously sampled value, no peak of the input signal $V_{IN}$ is detected and the peak detecting signal PKD is in its non-activated state; and if the later sampled value is lower than the previously sampled value, the arrival of the peak of the input signal $V_{IN}$ is detected and the peak detecting signal PKD generates the pulse.

Persons of ordinary skill in the art will recognize that the ADC should not be used to limit the present invention, in another embodiment, the peak detecting circuit 201 may have any other appropriate configuration, such as the configuration shown by the peak detecting circuit 1000 of FIG. 10.

Persons of ordinary skill in the art will recognize that, in the present invention, the delay signal DY is not necessarily the only condition for the switching control circuit 303 to start the on and off switching operations of the first switch S1. In other words, in an embodiment, the switching control circuit 303 is also under control of other conditions, the switching control circuit 303 starts the on and off switching operations of the first switch S1 only when the other conditions are satisfied and meanwhile the delay time $T_D$ expires. Of course, yet in another embodiment, the delay signal DY can be the only condition that controls the switching control circuit 303 to start the on and off switching operations of the first switch S1 in the switching circuit 11, that is, the switching control circuit 303 starts the on and off switching operations of the first switch S1 in the switching circuit 31 as long as the delay time $T_D$ expires.

Figure 5:
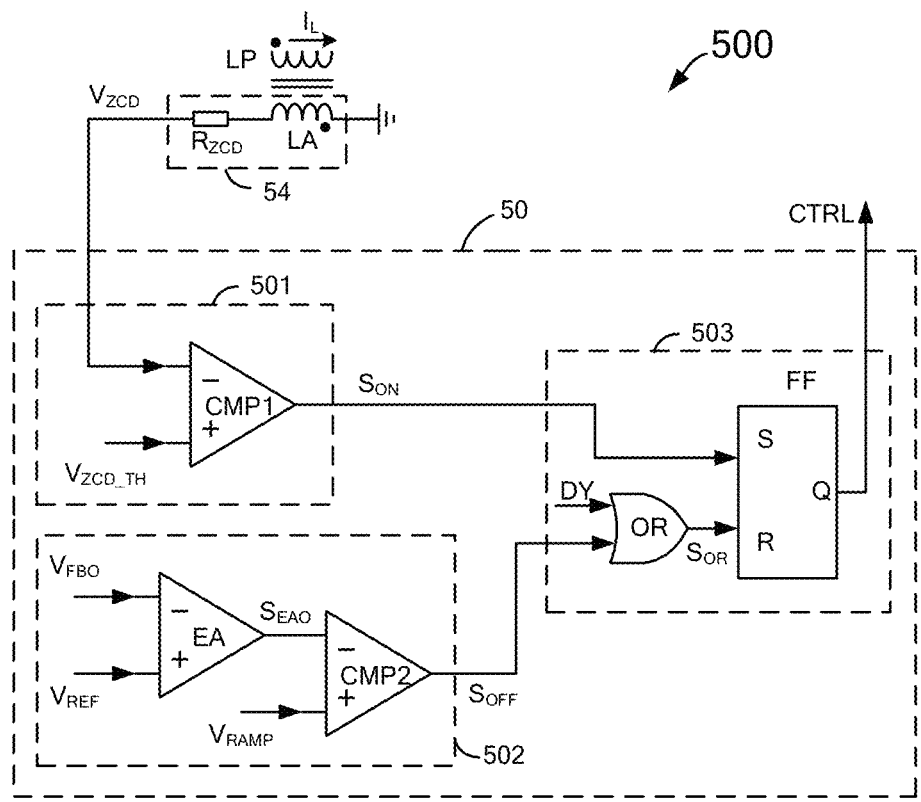
FIG. 5 schematically illustrates a switching control circuit 500 used in the SMPS of FIG. 2-4 in accordance with an embodiment of the present invention.

FIG. 5 schematically illustrates a switching control circuit 500 used in the SMPS of FIG. 2~4 in accordance with an embodiment of the present invention. As shown in FIG. 5, the switching control circuit 500 is configured to comprise an on moment generating circuit 501, an off moment generating circuit 502 and a logic circuit 503. The on moment generating circuit 501 is configured to generate an on signal $S_{ON}$ to control the on moments of the first switch S1. The off moment generating circuit 502 is configured to generate an off signal $S_{OFF}$ to control the off moments of the first switch S1. The logic circuit 503 is coupled to the on moment generating circuit 501, the off moment generating circuit 502 and the delay circuit (not shown) to respectively receive the on signal $S_{ON}$, the off signal $S_{OFF}$ and the delay signal DY, and to further generate a control signal CTRL based on the on signal $S_{ON}$, the off signal $S_{OFF}$ and the delay signal DY to control the on and off switching operations of the first switch S1.

In the SMPS comprising the switching control circuit 500 of FIG. 5, the SMPS is further configured to comprise a zero-crossing detecting circuit 54 coupled to the primary winding LP to detect the primary current $I_L$ flowing through the primary winding LP and configured to generate a zero-crossing detecting signal $V_{ZCD}$ representative of the primary current $I_L$. FIG. 5 schematically illustrates a configuration of the zero-crossing detecting circuit 54. As shown in FIG. 5, the zero-crossing detecting circuit 54 is configured to comprise an auxiliary winding LA coupled to the primary winding LP to detect the primary current $I_L$ flowing through the primary winding LP. In particular, the auxiliary winding LA has a first terminal and a second terminal, wherein the first terminal of the auxiliary winding LA is configured to provide the zero-crossing detecting signal $V_{ZCD}$, and the second terminal of the auxiliary winding LA is coupled to the reference ground GND.

Yet in another embodiment, the zero-crossing detecting circuit 54 is configured to comprise a detecting resistor $R_{ZCD}$ having a first terminal and a second terminal, wherein the first terminal of the detecting resistor $R_{ZCD}$ is coupled to the first terminal of the auxiliary winding LA, and the second terminal of the detecting resistor $R_{ZCD}$ is configured to provide the zero-crossing detecting signal $V_{ZCD}$.

The on moment generating circuit 501 is configured to comprise an on comparator CMP1 having a first input terminal, a second input terminal and an output terminal, wherein the first input terminal of the on comparator CMP1 is coupled to the zero-crossing detecting circuit 54 to receive the zero-crossing detecting signal $V_{ZCD}$, and the second input terminal of the on comparator CMP1 is configured to receive the zero-crossing threshold signal $V_{ZCD\_TH}$, the on comparator CMP1 compares the zero-crossing detecting signal $V_{ZCD}$ with the zero-crossing threshold signal $V_{ZCD\_TH}$ and to generate the on signal $S_{ON}$ based on the comparison to control the on moments when the first switch S1 is turned on. In an embodiment, the first input terminal of the on comparator CMP1 may be an inverting input terminal of the on comparator CMP1, and the second input terminal of the on comparator CMP1 may be a non-inverting input terminal of the on comparator CMP1.

The off moment generating circuit 502 is configured to receive a feedback signal $V_{FBO}$ representative of the output voltage $V_{OUT}$, and to generate the off signal $S_{OFF}$ to control the off moments when the first switch S1 is turned off. In more detail, as shown in FIG. 5, the off moment generating circuit 502 is configured to comprise an error amplifier EA and an on comparator CMP2. The error amplifier EA has a first input terminal, a second input terminal and an output terminal, wherein the first input terminal of the error amplifier EA is configured to receive the feedback signal $V_{FBO}$, the second input terminal of the error amplifier EA is configured to receive a reference signal $V_{REF}$, and the error amplifier EA amplifies the difference between the reference signal $V_{REF}$ and the feedback signal $V_{FBO}$ and to provide an error amplifying signal $S_{EAO}$ at the output terminal of the error amplifier EA. The off comparator CMP2 has a first input terminal, a second input terminal and an output terminal, wherein the first input terminal of the off comparator CMP2 is coupled to the output terminal of the error amplifier EA to receive the error amplifying signal $S_{EAO}$, and the second input terminal of the off comparator CMP2 is configured to receive a ramp signal $V_{RAMP}$ representative of the instantaneous value of the input signal $V_{IN}$, the off comparator CMP2 compares the error amplifying signal $S_{EAO}$ with the ramp signal $V_{RAMP}$ and generates the off signal $S_{OFF}$ based on the comparison to control the off moments when the first switch S1 is turned off. In an embodiment, the first input terminal of the error amplifier EA may be an inverting terminal of the error amplifier EA, and the second input terminal of the error amplifier EA may be a non-inverting terminal of the error amplifier EA. In an embodiment, the first input terminal of the off comparator CMP2 may be an inverting terminal of the off comparator CMP2, and the second input terminal of the off comparator CMP2 may be a non-inverting terminal of the off comparator CMP2.

The logic circuit 503 is configured to receive the on signal $S_{ON}$, the off signal $S_{OFF}$ and the delay signal DY, and to generate the control signal CTRL based on the on signal $S_{ON}$, the off signal $S_{OFF}$ and the delay signal DY to control the on and off switching operations of the first switch S1. In more detail, when the delay circuit is timing, that is, when the delay signal DY is in the activated state (logic 1), the on signal $S_{ON}$ and the off signal $S_{OFF}$ are override by the delay signal DY and thus takes no effects, whereas the delay signal DY takes effects, and as a result, the output of the logic circuit 503 is in a non-activated state (logic 0) and the first switch S1 is off during the activated state of the delay signal DY. When the delay circuit stops timing, that is, when the delay signal DY is in the non-activated state (logic 0), the delay signal DY stops taking effects, thus, the switching control circuit 50 controls the on and off switching operations of the first switch S1 based on the on signal $S_{ON}$ and the off signal $S_{OFF}$. If the on signal $S_{ON}$ is in its activated state, the output of the logic circuit 503 is in an activated state (logic 1) to turn on the first switch S1; and if the off signal $S_{OFF}$ is in its non-activated state, the output of the logic circuit 503 outputs the non-activated state to turn off the first switch S1.

FIG. 5 schematically illustrates a specific configuration of the logic circuit 503. The logic circuit 503 is configured to comprise an OR gate having a first input terminal, a second input terminal and an output terminal, wherein the first input terminal of the OR gate is configured to receive the delay signal DY, the second input terminal of the OR gate is coupled to the off moment generating circuit 502 to receive the off signal $S_{OFF}$, the OR gate is configured to generate an OR signal $S_{OR}$ based on the delay signal DY and the off signal $S_{OFF}$. The logic circuit 503 is further configured to comprise a RS flip-flop FF having a set terminal S, a reset terminal R and an output terminal Q, wherein the set terminal S is coupled to the on moment generating circuit 502 to receive the on signal $S_{ON}$, the reset terminal R is coupled to the OR gate to receive the OR signal $S_{OR}$, the RS flip-flop FF is configured to generate the control signal CTRL at its output terminal based on the OR signal $S_{OR}$ and the off signal $S_{OFF}$.

Figure 6:
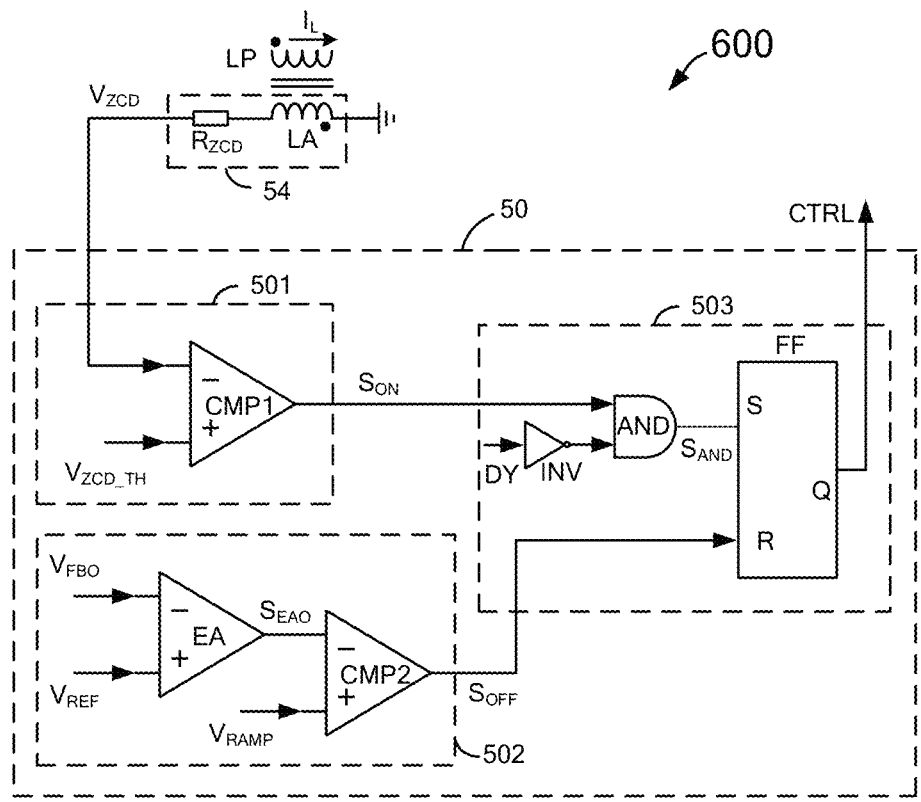
FIG. 6 schematically illustrates an SMPS 600 comprising a logic circuit 503 with a different configuration.

Persons of ordinary skill in the art will recognize that, the logic circuit 503 of FIG. 5 is only illustrative, and in other embodiments, the logic circuit 503 may have other configurations. FIG. 6 schematically illustrates an SMPS 600 comprising a logic circuit 503 with a different configuration. In the logic circuit 503 of FIG. 6, the logic circuit 503 comprises an inverting circuit INV and an AND gate to replace the OR gate in FIG. 5. The inverting circuit INV is configured to receive and to further invert the delay signal DY, and to output the inverted signal of the delay signal DY. The AND gate has a first input terminal, a second input terminal and an output terminal, wherein the first input terminal of the AND gate is coupled to the on moment generating circuit 501 to receive the on signal $S_{ON}$, the second input terminal of the AND gate is configured to receive the inverted signal of the delay signal DY, and the AND gate is configured to output an AND signal $S_{AND}$ based on the on signal $S_{ON}$ and the inverted signal of the delay signal DY. In more detail, when the delay signal DY is in its activated state, the inverted signal of the delay signal DY is in a non-activated state, which thus overrides the on signal $S_{ON}$, that is, the AND signal $S_{AND}$ is in its non-activated state no matter the on signal $S_{ON}$ is in its activated state or non-activated state, thus, the first switch S1 will not be turned on, in other words, the SMPS 600 will not start the on and off switching operations of the switch S1. In contrast, when the delay signal DY is in its non-activated state, the inverted signal is then in its activated state, the on signal $S_{ON}$ takes effects on the RS flip-flop FF which in turn generates the control signal CTRL based on the on signal $S_{ON}$ and the off signal $S_{OFF}$ to turn the first switch S1 on and off alternately.

In another embodiment, the logic circuit 503 comprises a switch instead of the OR gate, and the switch is coupled between the output terminal of the RS flip-flop FF and the reference ground GND and is under the control of the delay signal DY. When the delay signal DY is in its activated state, the switch is turned on, and the output of the flip-flop FF is pulled down to the reference ground GND, and the first switch S1 will thus not be turned on, that is, the SMPS will not start the on and off switching operations of the first switch S1. When the delay signal DY is in its non-activated state, the switch is turned off, and the flip-flop FF generates the control signal CTRL based on the on signal $S_{ON}$ and the off signal $S_{OFF}$ to control the on and off switching operations of the first switch S1.

Persons of ordinary skill in the art will recognize that, in some other embodiments, the delay signal DY is not the only condition that determines the start of the on and off switching operations of the first switch S1, in other words, the logic circuit 503 is further configured to receive signals representative of other conditions. For example, in an embodiment, the SMPS is further configured to detect whether a supply voltage for supplying power to internal circuits in the SMPS satisfies a preset condition, the on and off switching operations of the first switch S1 starts when both the supply voltage satisfies the preset condition and the delay signal DY satisfies its corresponding condition. In another embodiment, the SMPS is further configured to detect whether the alternate current input signal satisfies a preset condition, the on and off switching operations of the first switch S1 starts when both the alternate current input signal satisfies its corresponding preset condition and the delay signal DY satisfies its corresponding condition. Yet in another embodiment, the on and off switching operations of the first switch S1 starts when the supply voltage satisfies its corresponding preset condition, the alternate current input signal satisfies its corresponding preset condition and the delay signal DY satisfies its corresponding condition.

Figure 7:
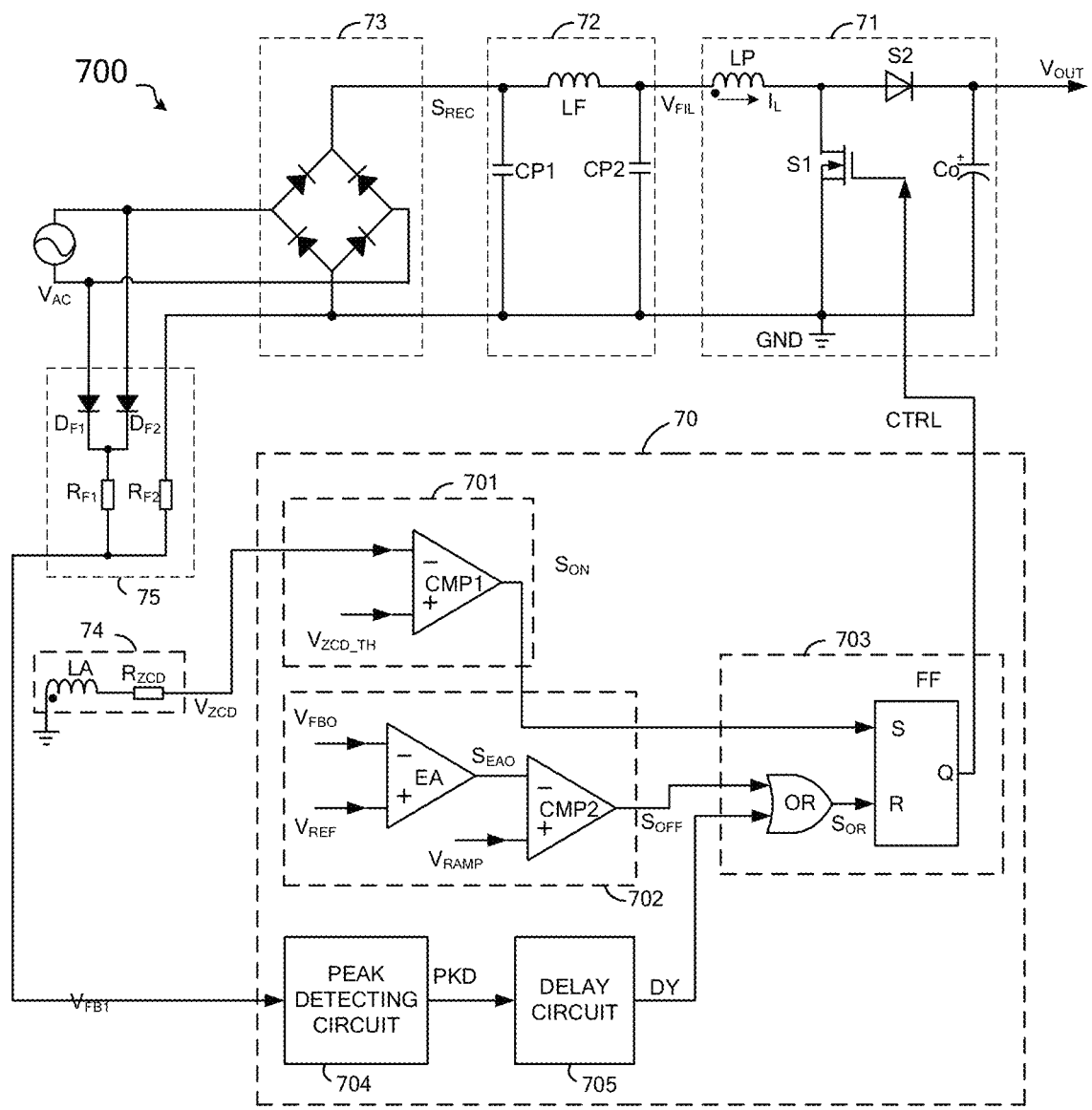
FIG. 7 schematically illustrates an SMPS 700 with the switching control circuit 50 being used in the SMPS of FIG. 3.
Figure 8:
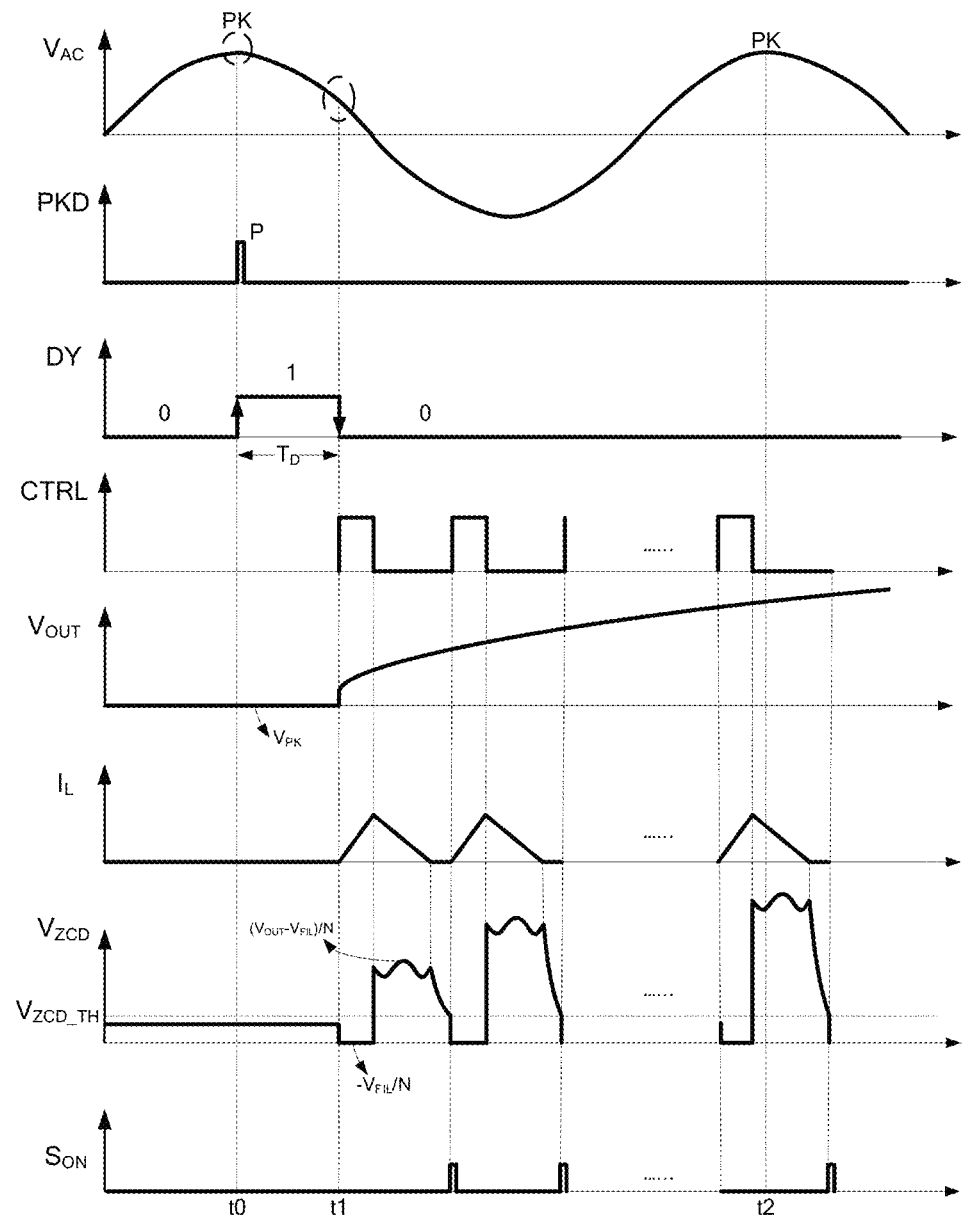
FIG. 8 shows the operating waveforms of the SMPS 700.

For the ease of describing the operating principle and the waveforms, FIG. 7 schematically illustrates an SMPS 700 with the switching control circuit 500 being implemented in the SMPS 300 of FIG. 3. FIG. 8 shows a plurality of operating waveforms of the SMPS 700. From up and down, FIG. 8 shows the alternate current input signal $V_{AC}$, the peak detecting signal PKD, the delay signal DY, the control signal CTRL, the output signal $V_{OUT}$, the primary current $I_L$, the zero-crossing detecting signal $V_{ZCD}$ and the on signal $S_{ON}$.

As shown in FIG. 8, the alternate current input signal $V_{AC}$ has a plurality of peaks PK. At moment t0, one peak PK of the alternate current input signal $V_{AC}$ arrives, the peak detecting circuit 704 detects the arrival of this peak PK and the peak detecting signal PKD generates a pulse P correspondingly. Being triggered by the pulse P, the delay circuit 705 starts timing and the delay signal DY thus transits from the non-activated state ("0") to the activated state ("1"). At moment t1, the period of time $T_D$ expires, the delay circuit 705 thus stops timing and the delay signal DY transits from its activated state ("1") to its non-activated state ("0"). Afterwards, the switching control circuit 70 starts controlling the on and off switching operations of the first switch S1, and the SMPS converts the alternate current input signal $V_{AC}$ into the output signal $V_{OUT}$ by turning the first switch S1 on and off alternately. At moment t2, the next peak PK of the alternate current input signal $V_{AC}$ arrives.

As can be known from the operating principle of the SMPS 700, when the control signal CTRL is in an activated state, the first switch S1 is turned on, and the current $I_L$ flowing through the first switch S1 increases, the zero-crossing detecting signal is equal to $-V_{FIL}/N$; when the control signal CTRL is in a non-activated state, the first switch S1 is turned off, the current $I_L$ flowing through the first switch S1 decreases, and the zero-crossing detecting signal is equal to $(V_{OUT}-V_{FIL})/N$ (the ripple not considered), wherein N is the turns ration between the primary winding LP and the auxiliary winding LA. When the current $I_L$ decreases to zero, the zero-crossing detecting signal $V_{ZCD}$ drops to the zero-crossing threshold signal $V_{ZCD\_TH}$, and the on signal $S_{ON}$ activates to turn on the first switch S1 until an off condition of the first switch S1 is satisfied.

As shown in FIG. 8, at moment t1, on one hand, the filtering signal $V_{FIL}$ is lower than the peak value VPK of the alternate current input signal $V_{AC}$, and on the other hand, the initial value of the output voltage $V_{OUT}$ is always equal to the peak value VPK of the alternate current input signal $V_{AC}$, thus, during the first period since the moment t1, the value $((V_{OUT}-V_{FIL})/N)$ of the zero-crossing detecting signal $V_{ZCD}$ is relatively large, as a result, the sum of the zero-crossing detecting signal $V_{ZCD}$ and the ripple will not reach the zero-crossing threshold signal $V_{ZCD\_TH}$ to trigger the on switching operation of the first switch S1. At the moment t2 when the next peak PK arrives, although the value of the filtering signal $V_{FIL}$ is substantially equal to the peak value VPK of the alternate current input signal $V_{AC}$, but due to the on and off switching operations of a plurality of cycles, the output voltage $V_{OUT}$ increases and is much higher than the filtering signal $V_{FIL}$, as a result, the sum of the zero-crossing detecting signal $V_{ZCD}$ and the ripple will not reach the zero-crossing threshold signal $V_{ZCD\_TH}$ to trigger the on switching operation of the first switch S1 falsely.

As a result, according to the present invention, the SMPS 700 can avoid starting the on and off switching operations of the first switch S1 near the peak of the input signal $V_{IN}$, which in turn ensures that the sum of the zero-crossing detecting signal $V_{ZCD}$ and the ripple will not reach the zero-crossing threshold signal $V_{ZCD\_TH}$ to falsely trigger the first switch S1 due to the situation that the output voltage $V_{OUT}$ is close to the voltage $V_{FIL}$ received by the switching circuit 70.

Figure 9:
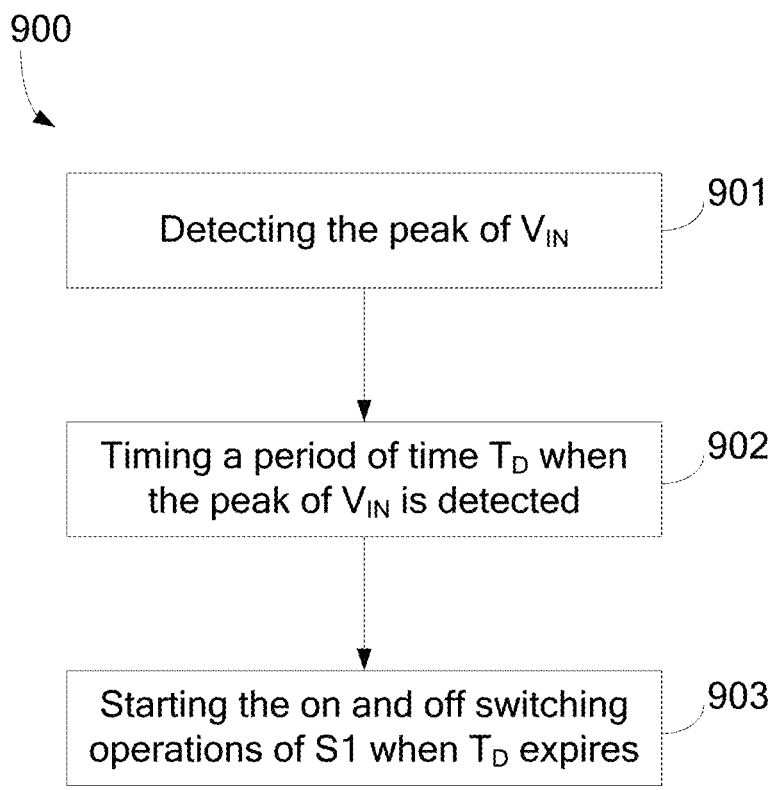
FIG. 9 illustrates a driving method 900 for driving an SMPS in accordance with an embodiment of the present invention.

FIG. 9 illustrates a driving method 900 for driving an SMPS in accordance with an embodiment of the present invention. The SMPS comprises a first switch S1, and the SMPS converts an input signal $V_{IN}$ with a peak into an output signal $V_{OUT}$ through the on and off switching operations of the first switch S1.

As shown in FIG. 9, the driving method 900 comprises steps 901~903. In step 901, it is performed to detect the peak of the input signal $V_{IN}$. After the arrival of the peak of the input signal $V_{IN}$, the driving method 900 proceeds to step 902 to time a period of time $T_D$. After the period of time $T_D$ expires, the driving method 900 goes to step 903 to start the on and off switching operations of the first switch S1.

In an embodiment, the SMPS is configured to receive an alternate current input signal and to further rectify the alternate current input signal so as to generate a rectified signal. In an embodiment, the input signal is the alternate current input signal, and in such the embodiment, the period of time $T_D$ has a value that is not equal to an integral multiple of one half of the cycle of the input signal $V_{IN}$, for example, the period of time $T_D$ can be less than one half of the cycle of the input signal $V_{IN}$, in more particular, the period of time $T_D$ can be equal to or less than a quarter of the cycle of the input signal $V_{IN}$. In other embodiment, for example, in the embodiment where the input signal $V_{IN}$ is the rectified signal, the period of time $T_D$ has a value that is not equal to an integral multiple of one cycle of the rectified signal, for example, the period of time $T_D$ can be less than the cycle of the rectified signal, in more particular, the period of time $T_D$ can be equal to or less than a quarter of the cycle of the rectified signal.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

What is claimed is:

1. A driving circuit in a switching mode power supply, wherein the switching mode power supply comprises a first switch and the switching mode power supply is configured to convert an input signal with a peak into an output signal through the on and off switching operations of the first switch, the driving circuit comprising:
   a peak detecting circuit configured to detect the peak of the input signal;
   a delay circuit configured to time a period of time since the arrival of the peak of the input signal and to generate a delay signal; and
   a switching control circuit configured to start the on and off switching operations of the first switch when the period of time expires; wherein the switching control circuit comprises:
   an on moment generating circuit configured to generate an on signal to control the on moments of the first switch;
   an off moment generating circuit configured to generate an off signal to control the off moments of the first switch; and
   a logic circuit coupled to the on moment generating circuit, the off moment generating circuit and the delay circuit to respectively receive the on signal, the off signal and the delay signal, wherein the logic circuit is configured to generate a control signal based on the on signal, the off signal and the delay signal to control the on and off switching operations of the first switch.

2. The driving circuit of claim 1, wherein the peak detecting circuit is configured to detect the peak of the input signal
   through a feed forward signal representative of the input signal and to generate a peak detecting signal based on the detection of the peak of the input signal;
   the delay circuit is coupled to the peak detecting circuit to receive the peak detecting signal and is configured to generate the delay signal based on the peak detecting signal; and
   the switching control circuit is coupled to the delay circuit to receive the delay signal and is configured to control the start of the on and off switching operations of the first switch based on the delay signal.

3. The driving circuit of claim 2, wherein
   the peak detecting signal transits from a non-activated state into an activated state when the arrival of the peak of the input signal is detected;

the delay circuit starts timing and the delay signal transits from a non-activated state into an activated state when the peak detecting signal transits from the non-activated state into the activated state, and the delay circuit stops timing and the delay signal transits from the activated state into the non-activated state when the period of time expires; and
the switching control circuit starts the on and off switching operations of the first switch when the delay signal transits from the activated state into the non-activated state.

4. The driving circuit of claim 1, wherein the peak detecting circuit is an analog to digital converter.

5. The driving circuit of claim 1, wherein the switching mode power supply comprises a primary winding and a zero-crossing detecting circuit, wherein the zero-crossing detecting circuit is coupled to the primary winding to detect the current flowing through the primary winding and is configured to generate a zero-crossing detecting signal representative of the current, and wherein the on moment generating circuit is configured to comprise an on comparator having a first input terminal, a second input terminal and an output terminal, and wherein the first input terminal is coupled to the zero-crossing detecting circuit to receive the zero-crossing detecting signal, the second input terminal is configured to receive a zero-crossing threshold signal, and the on comparator is configured to generate the on signal based on comparing the zero-crossing detecting signal with the zero-crossing threshold signal.

6. The driving circuit of claim 1, wherein the off moment generating circuit comprises:
an error amplifier having a first input terminal, a second input terminal and an output terminal, wherein the first input terminal is configured to receive a feedback signal representative of the output signal, the second input terminal is configured to receive a reference signal, the error amplifier is configured to generate an error amplifying signal at the output terminal based on amplifying the difference between the reference signal and the feedback signal; and
an off comparator having a first input terminal, a second input terminal and an output terminal, wherein the first input terminal is coupled to the output terminal of the error amplifier to receive the error amplifying signal, the second input terminal is configured to receive a ramp signal, the off comparator is configured to generate the off signal at the output terminal based on comparing the error amplifying signal with the ramp signal.

7. A driving circuit in a switching mode power supply, wherein the switching mode power supply comprises a first switch and the switching mode power supply is configured to convert an input signal with a peak into an output signal through the on and off switching operations of the first switch, the driving circuit comprising:
a peak detecting circuit configured to detect the peak of the input signal;
a delay circuit configured to time a period of time since the arrival of the peak of the input signal and to generate a delay signal; and
a switching control circuit configured to start the on and off switching operations of the first switch when the period of time expires; and wherein the switching mode power supply further comprises:
a rectifying circuit configured to rectify an alternate current input signal having a cycle to generate a rectified signal;
a filtering circuit configured to filter the rectified signal to generate a filtering signal; and
a switching circuit comprising the first switch, wherein the switching circuit is configured to convert the filtering signal into the output signal through the on and off switching operations of the first switch.

8. The driving circuit of claim 7, wherein the switching circuit comprises:
a primary winding having a first terminal and a second terminal, wherein the first terminal is configured to receive the filtering signal;
the first switch having a first terminal, a second terminal and a control terminal, wherein the first terminal is coupled to the second terminal of the primary winding, the second terminal is coupled to a reference ground, and the control terminal is coupled to the switching control circuit, and wherein the first switch performs the on and off switching operations under the control of the switching control circuit;
a second switch having a first terminal and a second terminal, wherein the first terminal is coupled to the second terminal of the primary winding; and
an output capacitor having a first terminal and a second terminal, wherein the first terminal is coupled to the second terminal of the second switch and is configured to provide the output signal, and the second terminal is coupled to the reference ground.

9. The driving circuit of claim 7, wherein the filtering circuit comprises:
a filtering inductor having a first terminal and a second terminal, wherein the first terminal is coupled to the rectifying circuit to receive the rectified signal; and
a filtering capacitor having a first terminal and a second terminal, wherein the first terminal is coupled to the second terminal of the filtering inductor and is configured to provide the filtering signal, and the second terminal is coupled to the reference ground.

10. The driving circuit of claim 7, wherein the switching mode power supply further comprises a feed forward circuit configured to receive the input signal and to generate a feed forward signal representative of the input signal, and wherein the peak detecting circuit is coupled to the feed forward circuit to receive the feed forward signal and is configured to detect the peak of the input signal through the feed forward signal.

11. The driving circuit of claim 7, wherein the input signal is the alternate current input signal, and the period of time is less than one half of the cycle of the input signal; or the input signal is the rectified signal, the period of time is less than one cycle of the input signal.

12. A switching mode power supply, comprising:
a first switch, wherein the switching mode power supply is configured to convert an input signal with a peak into an output signal through the on and off switching operations of the first switch;
a peak detecting circuit configured to detect the peak of the input signal;
a delay circuit configured to time a period of time since the arrival of the peak of the input signal is detected and to generate a delay signal;
a switching control circuit configured to start the on and off switching operations of the first switch when the period of time expires;
a rectifying circuit configured to rectify an alternate current input signal having a cycle to generate a rectified signal;

a filtering circuit configured to filter the rectified signal to generate a filtering signal; and a switching circuit comprising the first switch, wherein the switching circuit is configured to convert the filtering signal into the output signal through the on and off switching operations of the first switch.

13. The switching mode power supply of claim 12, wherein the switching circuit comprises:

a primary winding having a first terminal and a second terminal, wherein the first terminal is configured to receive the filtering signal;

the first switch having a first terminal, a second terminal and a control terminal, wherein the first terminal is coupled to the second terminal of the primary winding, the second terminal is coupled to a reference ground, and the control terminal is coupled to the switching control circuit, and wherein the first switch performs the on and off switching operations under the control of the switching control circuit;

a second switch having a first terminal and a second terminal, wherein the first terminal is coupled to the second terminal of the primary winding; and an output capacitor having a first terminal and a second terminal, wherein the first terminal is coupled to the second terminal of the second switch and is configured to provide the output signal, and the second terminal is coupled to the reference ground.

14. The switching mode power supply of claim 12, wherein the filtering circuit comprises:

a filtering inductor having a first terminal and a second terminal, wherein the first terminal is coupled to the rectifying circuit to receive the rectified signal; and a filtering capacitor having a first terminal and a second terminal, wherein the first terminal is coupled to the second terminal of the filtering inductor and is configured to provide the filtering signal, and the second terminal is coupled to the reference ground.

15. The switching mode power supply of claim 12, further comprises a feed forward circuit configured to receive the input signal and to generate a feed forward signal representative of the input signal, and wherein the peak detecting circuit is coupled to the feed forward circuit to receive the feed forward signal and is configured to detect the peak of the input signal through the feed forward signal.

\* \* \* \* \*